Nov. 24, 1953  E. V. BRISCOE  2,660,015
AUTOMATIC CONTROL MECHANISM FOR COTTON HARVESTERS
Filed March 10, 1952  2 Sheets-Sheet 1

INVENTOR
*Ernest V. Briscoe*

BY *Webster & Webster*
ATTORNEYS

Nov. 24, 1953  E. V. BRISCOE  2,660,015
AUTOMATIC CONTROL MECHANISM FOR COTTON HARVESTERS
Filed March 10, 1952  2 Sheets-Sheet 2

INVENTOR
Ernest V. Briscoe
BY
ATTORNEYS

Patented Nov. 24, 1953

2,660,015

UNITED STATES PATENT OFFICE 2,660,015

AUTOMATIC CONTROL MECHANISM FOR COTTON HARVESTERS

Ernest V. Briscoe, Kerman, Calif., assignor to E. V. Briscoe & Son, Kerman, Calif., a partnership Application March 10, 1952, Serial No. 275,705

3 Claims. (Cl. 56—11)

This invention relates in general to a tractor-mounted cotton harvester, and in particular the invention is directed to a harvester of this character which is provided, at the forward end, with a vertically adjustable cotton-picking unit.

In cotton harvesters of this type, the vertically adjustable cotton-picking unit is adapted to be set with said unit running at a predetermined level. While certain cotton harvesters of this type embody means whereby the cotton-picking unit can be caused to raise or lower in response to a manual action by the operator, a problem is nevertheless presented. This problem is occasioned by the fact that it is difficult for the operator, seated above the plants, to see the exact level at which the cotton-picking unit is running adjacent the ground, said unit being frequently obstructed at the lower portion by the overhang of said plants.

It is therefore the major object of the present invention to provide a mechanism which is operative, automatically, to maintain the picking unit at proper running level with respect to the ground; such mechanism being responsive to undulation of the ground as the tractor-mounted cotton harvester advances along a crop row.

Another important object of the present invention is to provide automatic control mechanism, for the vertically adjustable cotton-picking unit, which embodies a fluid pressure actuated power cylinder arranged to accomplish up or down adjustment of said unit in response to a valve which is in turn regulated by a floating wheel which travels on the ground, following its contour at a point immediately adjacent said cotton-picking unit.

An additional object of the invention is to mount the floating ground wheel in a position where it is not subject to interference by the cotton plants in the row along which the cotton harvester is working; there being novel actuating connections between the ground wheel and the control valve.

Another object of the invention is to provide automatic control mechanism, for the purpose described, which is adapted for ready and convenient attachment to existing cotton harvesters.

It is also an object of the invention to provide an automatic control mechanism as above, which is designed for ease and economy of manufacture and installation.

Still another object of the invention is to provide a practical and reliable automatic control mechanism for cotton harvesters, and one which will be exceedingly effective for the purpose for which it is designed.

These objects are accomplished by means of such structure and relative arrangement of parts as will fully appear by a perusal of the following specification and claims.

Figure 1:
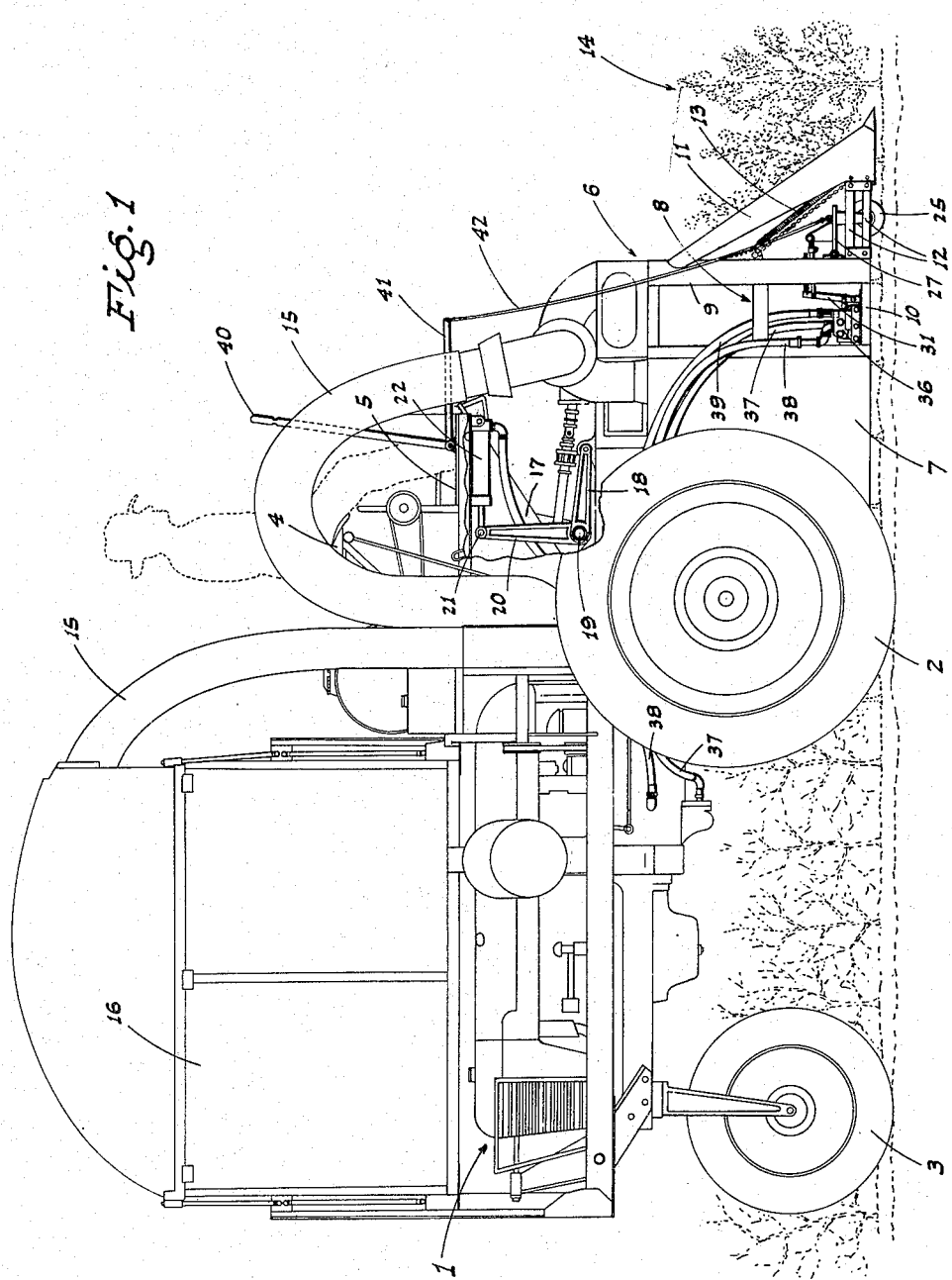
Fig. 1 is a side elevation of a cotton harvester embodying the present invention.
Figure 2:
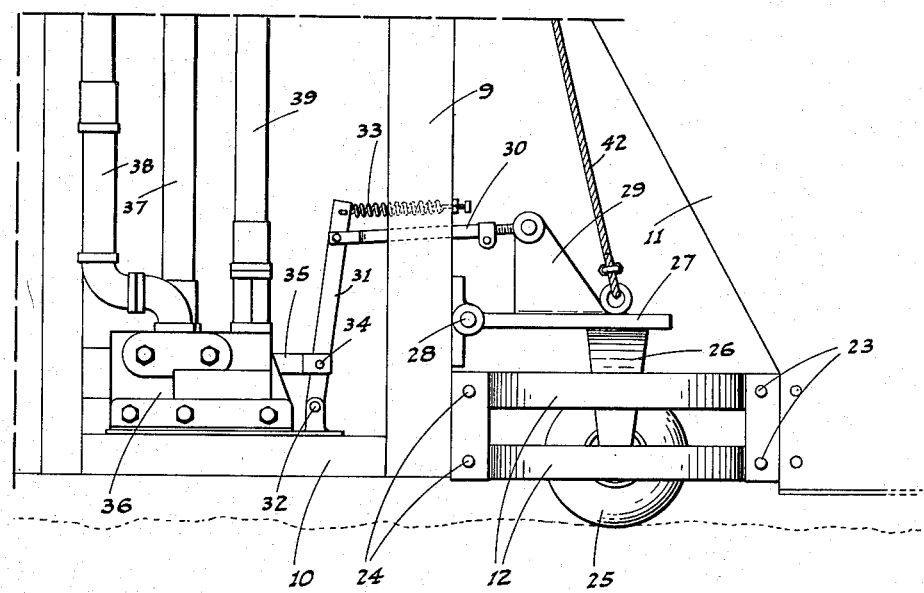
Fig. 2 is an enlarged fragmentary side elevation showing the floating ground wheel; the valve; and the connections between the same.

Referring now more particularly to the characters of reference on the drawings, the present invention is here shown as embodied in connection with a tractor-mounted cotton harvester which comprises a tractor indicated generally at 1, which tractor is fitted with transversely spaced driven front wheels 2 and a single rear tiller wheel 3 steered by the operator from the seat 4 at the front of the machine and at an elevated position; the steering mcehanism being omitted as the same is no part of the present invention.

The operator's seat 4 is supported above a foot platform structure 5 and below such platform but ahead of the front wheels, the harvester is fitted with a vertically adjustable cotton-picking unit indicated generally at 6. The cotton-picking unit 6 includes a housing 7 which encloses the picking rotors, not shown; said housing 7 including on opposite sides and at the front an upstanding frame structure 8. Each frame structure 8 embodies a forward post 9 and a bottom plate 10 disposed at the lower end and to the rear of said post.

Ahead of each of the frame structures 8 the cotton-picking unit 6 is fitted with upwardly and rearwardly inclined plant lifters 11 which form in effect a shield in front of each post 9. The plant lifters 11 are supported at the lower ends by longitudinally extending parallel linkage 12 which is pivotally connected between the corresponding lifter and the adjacent post 9. At their upper ends the plant lifters 11 bear against the front of the related posts, and such lifters are counter-balanced by tension springs 13.

In operation of the cotton harvester it advances along a row with the cotton plants 14 entering the cotton-picking unit 6 from between the plant lifters 11. The cotton bolls as picked in the unit 6 are transferred from the latter, by a suction conduit assembly 15, to a receiving basket 16 mounted on the tractor above the engine portion thereof.

The cotton-picking unit is suspended from the normally rear end of the main frame 17 of the tractor 1 in a manner which permits up and down movement and adjustment of said unit, as shown, for instance, in Patent No. 2,247,687. Such suspension means includes substantially horizontal arms 18 pivoted at their forward end on top of the unit 6 and projecting from a cross shaft 19 journaled on the frame 17.

The cross shaft 19 is fitted intermediate its ends with an upstanding lever arm 20 and the latter is pivotally connected at its upper end, as at 21, to the piston rod of a fluid pressure actuated power cylinder 22 mounted on the underside of the platform structure 5.

It will be recognized that upon actuation of the power cylinder 22 in a direction to advance its piston rod that the picking unit 6 will be adjusted upwardly, whereas retraction of the piston rod of cylinder 22 permits the picking unit 6 to lower.

Figure 3:
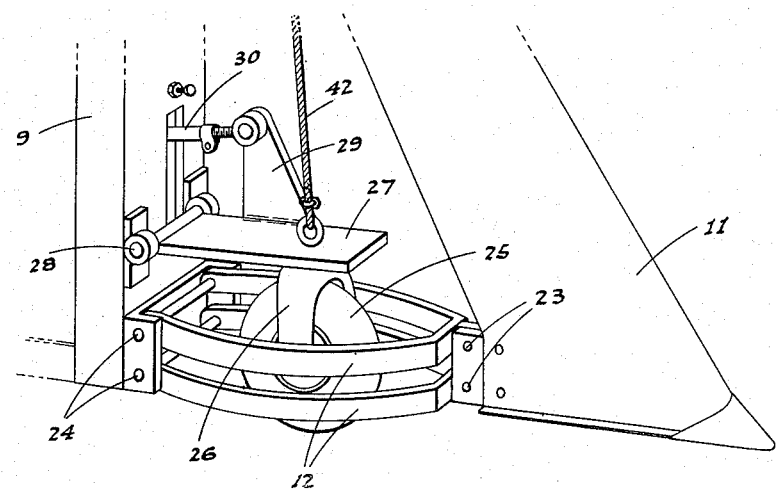
Fig. 3 is an enlarged fragmentary prospective view of the floating ground wheel showing particularly its mounting and its position rearwardly of one of the plant lifters.

The following automatic control mechanism is provided in connection with the power cylinder 22 for the purpose of maintaining the picking unit 6 at a predetermined working level closely adjacent but above the ground:

The parallel linkage 12 on one side of the cotton-picking unit 6 is in the form of yoke-like links as clearly shown in Fig. 3; the forward pivotal connections being indicated at 23 and the rear pivotal connections being indicated at 24.

A floating ground wheel 25 is disposed between the sides of the yoke-like linkage 12, and such ground wheel is carried in a fork 26. In turn, the fork 26 is fixed to a vertically swingable plate 27 which projects forwardly from the post 9; the plate 27 being pivoted as at 28 to said post.

Mounted as above described, the ground wheel 25 is carried on the cotton-picking unit 6 in a position to follow ground contour closely adjacent said unit; the wheel being protected from the cotton plants 14 by the corresponding plant lifter 11, and by the wheel-surrounding linkage 12. As the cotton harvester advances, the ground wheel 25 thus floats up and down, with corresponding vertical motion of the plate 27.

A rigid arm 29 upstands from the plate 27 and a longitudinal link 30, which is adjustable in length, connects between the upper end of said arm 29 and the upper portion of an upstanding lever 31 pivoted as at 32 on the bottom plate 10.

An adjustable tension spring 33 connects between the lever 31 and the post 9; such spring 33 normally urging the lever 31 forwardly, and consequently the plate 27 downwardly.

Intermediate its ends the lever 31 is pivoted as at 34 to the outer end of the shiftable control rod 35 which projects longitudinally from a valve 36 mounted on the bottom plate 10; said valve being of the type shown in Patent Nos. 2,247,140 and 2,247,141.

The valve 36 is included in a fluid pressure conduit system for the control of the power cylinder 22; such system including a pressure conduit 37 which leads from a pressure supply source on the tractor 1 to the valve 36. Additionally, said system includes a return conduit 38 connected between the valve 36 and the input side of said source on the tractor; there being a cylinder control or feed conduit 39 which leads from valve 36 to the power cylinder 22.

In operation of the above-described automatic control mechanism, the cotton-picking unit 6 is adapted to run at the bottom at a predetermined level adjacent the ground; said mechanism functioning automatically to maintain the unit the same distance above the ground regardless of rise or fall in the contour thereof. This is accomplished as follows: As the ground wheel 25 floats vertically imparting such motion to the vertically swinging plate 27, said motion is transmitted by the arm 29, link 30, and lever 31 to the shiftable control rod 35 of the valve 36, moving such rod one way or the other.

Upon upward motion of the wheel 25, the valve 36 is operated so as to deliver fluid pressure from the feed conduit 39 to the power cylinder 22 causing the latter to actuate to an extent to lift the cotton-picking unit 6 a distance proportionate to the upward movement of the ground wheel 25.

Conversely, downward movement of the ground wheel 25 works the valve 36 in a manner such that the power cylinder 22 is relieved to an extent sufficient to permit the cotton-picking unit 6 to lower, by its own weight, the distance required to maintain its desired working level.

The automatic control mechanism is thus very effective and practical for the intended purpose, accomplishing level control of the cotton-picking unit 6 within very accurate limits.

When the ground wheel 25 returns to proper level, causing the unit 6 to be restored to its working level in the manner previously described, the valve 36 is, of course, reshifted to its initial or starting position wherein the power cylinder 22 is held stationary, with fluid pressure by-passing between conduits 37 and 38.

The operation of the described control mechanism is normally without attention on the part of the operator of the harvester. However, under certain circumstances the operator may desire the cotton-picking unit 6 to be raised other than by response of the ground wheel 25 to ground contour. For this purpose the harvester is fitted with an upstanding hand lever 40 adjacent the seat 4, and such lever 40 works a forwardly projecting arm 41 up or down. A light-weight flexible cable 42 connects between the outer end of the arm 41 and the top of the vertically swingable plate 27.

By pulling rearwardly on the lever 41 the operator causes the plate 27 to rise, with the result that the valve 36 is operated in a direction such that the power cylinder 22 lifts the cotton-picking unit 6.

From the foregoing description it will be readily seen that there has been produced a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In a cotton harvester which includes a mobile frame mounted for movement along a crop row, a cotton picking unit, means suspending the unit from the frame for vertical adjustment, a normally inactive hydraulic power cylinder connected between the frame and said means to lift the unit upon pressure being supplied to the cylinder, and a fluid pressure conduit system connected to the cylinder; means to control the flow of fluid through the system to the cylinder to actuate the latter to lift the picking unit, the latter including an upstanding frame post and a plant lifter ahead of and spaced at its lower end from the post and providing a laterally extending recess therebetween, said control means comprising a valve interposed in the conduit system and mounted on the picking unit rearwardly of the post, said valve including a forwardly projecting actuating rod movable rearwardly to open the valve and supply fluid to the cylinder, a ground engaging wheel disposed in the recess, a substantially horizontal plate above and from which the wheel is supported, means pivoting the plate at its rear end on the post, a mechanism between said actuating rod and the plate to move the rod rearwardly upon upward tilting of the plate, and a spring acting on the rod and plate to pull the rod forwardly and press the plate down to maintain the wheel in contact with the ground.

2. A structure as in claim 1, with links extending between and connected to the post and plant lifter and between which the wheel is disposed in clearance relation.

3. A structure as in claim 1, with a flexible pull member connected to and projecting upwardly from the plate ahead of its pivot, and hand lever means mounted on the harvester frame and connected to the upper end of the pull member.

ERNEST V. BRISCOE.

References Cited in the file of this patent

UNITED STATES PATENTS

| Number | Name | Date |
| --- | --- | --- |
| 534,403 | Mechwart | Feb. 19, 1895 |
| 2,023,491 | Rust et al. | Dec. 10, 1935 |
| 2,247,687 | Johnston | July 1, 1941 |
| 2,476,910 | Read | July 19, 1949 |
| 2,514,764 | Herigstad | July 11, 1950 |
| 2,589,553 | Kesselring | Mar. 18, 1952 |